United States Patent
Youngerman et al.

(10) Patent No.: US 12,127,682 B2
(45) Date of Patent: Oct. 29, 2024

(54) RECLINER BEDDING SET

(71) Applicants: Sandra Joan Youngerman, Cando, ND (US); Glenn Youngerman, Moorhead, MN (US)

(72) Inventors: Sandra Joan Youngerman, Cando, ND (US); Glenn Youngerman, Moorhead, MN (US)

( * ) Notice: Subject to any disclaimer, the term of this patent is extended or adjusted under 35 U.S.C. 154(b) by 7 days.

(21) Appl. No.: 18/150,718

(22) Filed: Jan. 5, 2023

(65) Prior Publication Data
US 2023/0218095 A1    Jul. 13, 2023

Related U.S. Application Data

(60) Provisional application No. 63/302,603, filed on Jan. 25, 2022, provisional application No. 63/297,344, filed on Jan. 7, 2022.

(51) Int. Cl.
| | |
|---|---|
| *A47C 1/14* | (2006.01) |
| *A47C 1/02* | (2006.01) |
| *A47C 31/11* | (2006.01) |
| *A47C 7/42* | (2006.01) |
| *A47C 27/14* | (2006.01) |
| *B60N 2/60* | (2006.01) |

(52) U.S. Cl.
CPC .............. *A47C 31/11* (2013.01); *A47C 1/02* (2013.01); *A47C 1/14* (2013.01); *A47C 7/42* (2013.01); *A47C 27/14* (2013.01); *B60N 2/60* (2013.01)

(58) Field of Classification Search
CPC ........... B60N 2/60; A47C 27/14; A47C 31/11; A47C 1/143; A47C 1/14; A47C 1/146; A47C 7/42; A47C 7/425; A47C 7/44
See application file for complete search history.

(56) References Cited

U.S. PATENT DOCUMENTS

| | | | | |
|---|---|---|---|---|
| 5,010,610 | A * | 4/1991 | Ackley | A47C 17/64 |
| | | | | 5/691 |
| 5,265,292 | A | 11/1993 | Underell | |
| 6,237,173 | B1 * | 5/2001 | Schlichter | A47C 27/144 |
| | | | | 5/722 |
| 8,403,412 | B2 * | 3/2013 | Leeds | G06Q 30/0601 |
| | | | | 297/229 |
| 10,694,864 | B2 | 6/2020 | Leeds | |
| 2008/0060132 | A1 * | 3/2008 | Bradford | A47G 9/02 |
| | | | | 5/482 |
| 2017/0042341 | A1 * | 2/2017 | Scales | B60N 2/5858 |
| 2017/0190272 | A1 * | 7/2017 | Gellis | B60N 2/6063 |
| 2019/0269255 | A1 * | 9/2019 | Leeds | B60N 2/882 |

OTHER PUBLICATIONS

Blue Chip Medical, Geri-Gel Recliner Overlay-Model 6200NS Gel Overlay Recliner Cushion, https://www.bluechipmedical.com/seating-positioning-3/gerichairs-recliners/geri-gel-recliner-overlay/, Jan. 5, 2023.

* cited by examiner

*Primary Examiner* — Syed A Islam

(74) *Attorney, Agent, or Firm* — Fargo Patent & Business Law; Thomas Kading

(57) ABSTRACT

A recliner pad assembly for a recliner type chair includes an outer cover that surrounds an inner cushion, the outer cover includes an upper attachment arrangement and a lower attachment arrangement.

16 Claims, 9 Drawing Sheets

RECLINER BEDDING SET

The present disclosure claims priority to United States Provisional Patent Disclosure Ser. No. 63/297,344 filed Jan. 7, 2022 and United States Provisional Patent Disclosure Ser. No. 63/302,603 filed Jan. 25, 2022.

BACKGROUND

The present disclosure relates to a recliner bedding set for a recliner type chair to convert the recliner type chair into a bed.

The length of time after which a chair will be considered comfortable varies widely based on the characteristics of the chair and sensitivity of the user. Recliner type chairs, although comfortable in certain aspects may also have issues with the gaps between articulatable portions.

SUMMARY

A recliner pad assembly for a recliner type chair according to one disclosed non-limiting embodiment of the present disclosure includes an outer cover that surrounds an inner cushion, wherein the inner cushion is substantially rectangular with opposite sides and first and second ends that extend between the sides, the sides spaced apart by a width in a range of 18-33 inches and the first and second ends spaced apart by a length of 65-70 inches, the outer cover includes an upper attachment arrangement and a lower attachment arrangement.

A further embodiment of any of the foregoing embodiments of the present disclosure includes that the inner cushion includes two or more foams.

A further embodiment of any of the foregoing embodiments of the present disclosure includes that the inner cushion comprises a thickness of 2-3 inches.

A further embodiment of any of the foregoing embodiments of the present disclosure includes that the inner cushion comprises a viscoelastic foam.

A further embodiment of any of the foregoing embodiments of the present disclosure includes a zipper in the outer cover.

A further embodiment of any of the foregoing embodiments of the present disclosure includes that the upper attachment arrangement comprises a strap.

A further embodiment of any of the foregoing embodiments of the present disclosure includes that the upper attachment arrangement comprises an "X" arrangement of straps.

A further embodiment of any of the foregoing embodiments of the present disclosure includes that the lower attachment arrangement comprises a strap.

A further embodiment of any of the foregoing embodiments of the present disclosure includes that the lower attachment arrangement comprises a first and second triangular pocket.

A further embodiment of any of the foregoing embodiments of the present disclosure includes that the upper attachment arrangement comprises a strap and the lower attachment arrangement comprises a first and second triangular pocket.

A further embodiment of any of the foregoing embodiments of the present disclosure includes that the upper attachment arrangement comprises an "X" arrangement of straps and the lower attachment arrangement comprises a strap.

A further embodiment of any of the foregoing embodiments of the present disclosure includes the inner cushion is substantially rectangular with opposite sides and first and second ends extending between the sides, the sides spaced apart by a width associated with arms of a recliner and the first and second ends spaced apart by a length to cover a back and a footrest.

A fitted recliner sheet for a recliner type chair according to one disclosed non-limiting embodiment of the present disclosure includes a rectilinear sheet with an elastic top edge that fits over a top of a back support of the recliner type chair.

A further embodiment of any of the foregoing embodiments of the present disclosure includes wherein the rectilinear sheet has a length of 72 inches and a width of 54 inches.

A further embodiment of any of the foregoing embodiments of the present disclosure includes wherein the rectilinear sheet comprises arm portions fit over each armrest of the recliner type chair.

A further embodiment of any of the foregoing embodiments of the present disclosure includes wherein the arm portion are separately sewed into the rectilinear sheet to form the pockets configured to match the shape of the recliner type chair.

A recliner bedding set for a recliner type chair according to one disclosed non-limiting embodiment of the present disclosure includes an inner cushion, wherein the inner cushion is substantially rectangular with opposite sides and first and second ends extending between the sides, the sides spaced apart by a width associated with arms of a recliner type chair and the first and second ends spaced apart by a length to cover a back support and a footrest of the recliner type chair; an outer cover that surrounds the inner cushion; an upper attachment arrangement on the outer cover to attach to the recliner type chair; a lower attachment arrangement on the outer cover to attach to the recliner type chair; a fitted recliner sheet with an elastic top edge that fits over a top of the back support of the recliner type chair; and a flat sheet that fits at least partially over the fitted recliner sheet.

A further embodiment of any of the foregoing embodiments of the present disclosure includes wherein the inner cushion is substantially rectangular with opposite sides and first and second ends extending between the sides, the sides spaced apart by a width in a range of 18-33 inches and the first and second ends spaced apart by a length of 65-70 inches, the fitted recliner sheet has a length of 72 inches and a width of 54 inches and the flat sheet has a length of 65 inches and a width of 60 inches.

The foregoing features and elements may be combined in various combinations without exclusivity, unless expressly indicated otherwise. These features and elements as well as the operation thereof will become more apparent in light of the following description and the accompanying drawings. It should be appreciated however that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
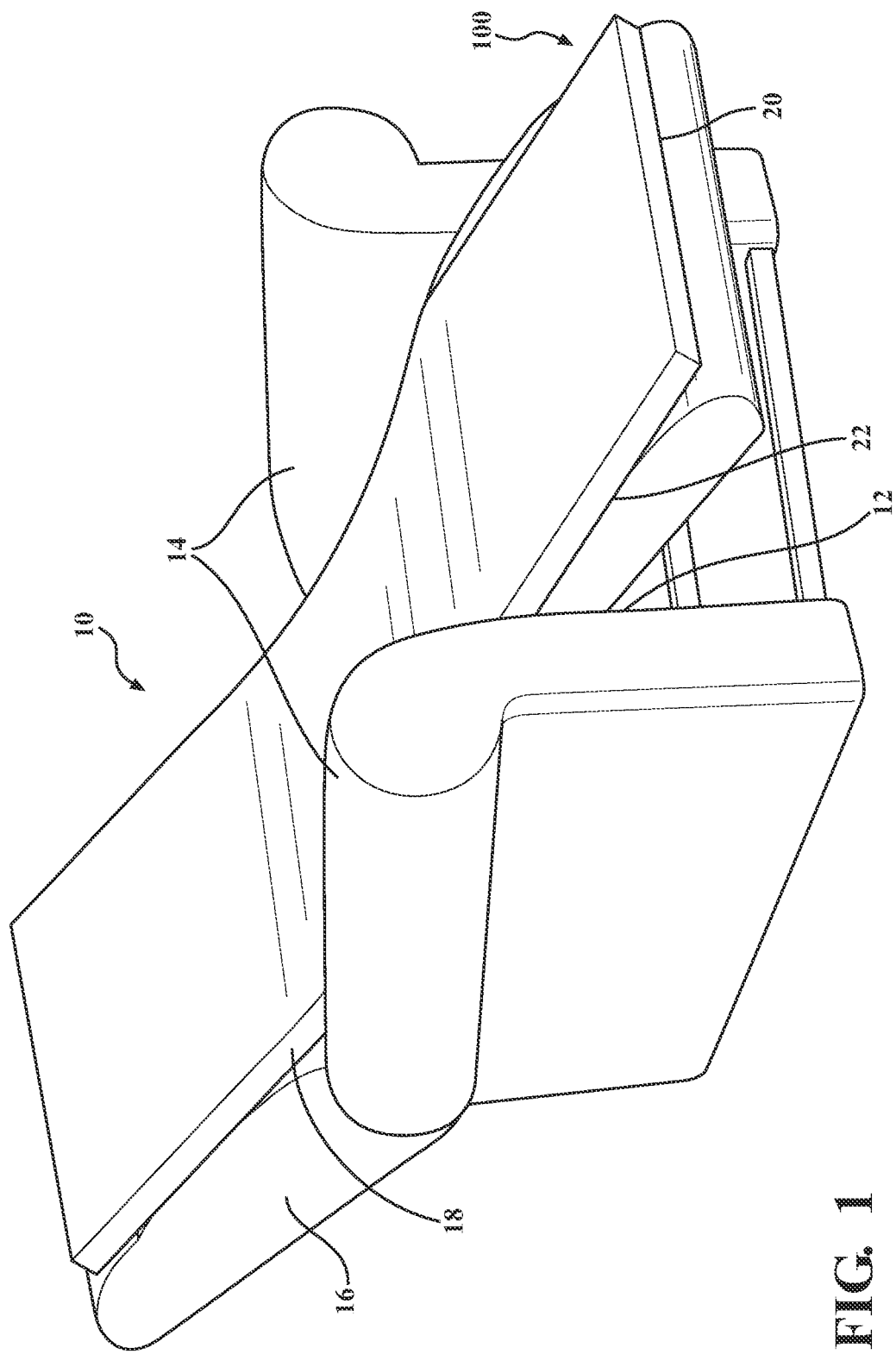
FIG. 1 is a perspective view of a recliner pad assembly that is intended primarily for use on a recliner type chair according to one disclosed non-limiting embodiment.

FIG. 1 schematically illustrates a recliner pad assembly 100 that is intended primarily for use on a recliner type chair 10. The chair 10 includes a hip/thigh support 12 disposed between two armrests 14. A back support 16 is hinged to the hip/thigh support 12 and can move between a substantially erect position (not shown) and an at least partly reclined position. The back support 16 may also be pivoted to a fully reclined condition where the back support 16 is substantially in the same plane as the hip/thigh support 12. A gap 18 necessarily exists between the hip/thigh support 12 and the back support 16 to accommodate the relative pivoting movement. The chair 10 also may have a footrest 20 that is hinged relative to the hip/thigh support 12. A gap 22 exists between the hip/thigh support 12 and the footrest 20. Other cracks, creases and seams may exist at other locations on the chair 10

Figure 2:
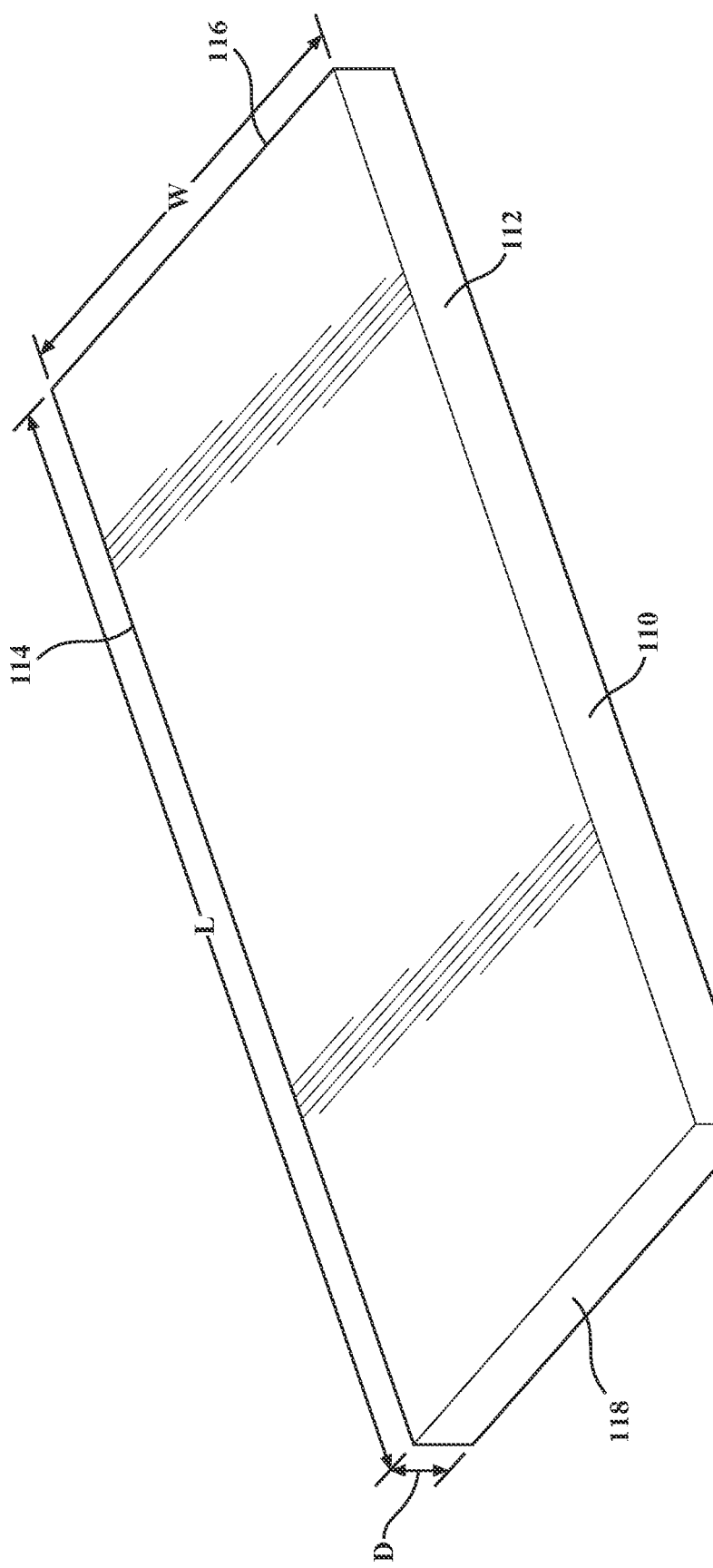
FIG. 2 is a perspective view of the recliner pad according to one disclosed non-limiting embodiment.

With reference to FIG. 1 and FIG. 2, the recliner pad assembly 100 in accordance with an embodiment includes an inner cushion 110 that includes a viscoelastic foam or other cushion like material. The inner cushion 110 may be manufactured of a single or combination of foams, that in one example, may be a polyurethane foam that has a density of about 1.8 pounds per inch. A viscoelastic foam within such a range is well suited for use with the recliner pad assembly 100.

The inner cushion 110 is substantially rectangular and has opposite sides 112 and 114 and opposite first and second ends 116, 118 extending between the sides 112, 114. The sides 112, 114 are spaced apart by a width W that preferably is in a range of 18-33 inches. The first and second ends 116, 118 are spaced from one another by a length L that substantially corresponds to a sum of the lengths of the hip/thigh support 12, the back support 16 and the footrest 20. For example, a length L may be approximately 65-70 inches and the thickness D of the inner cushion 110 may be about 2-3 inches.

Figure 3:
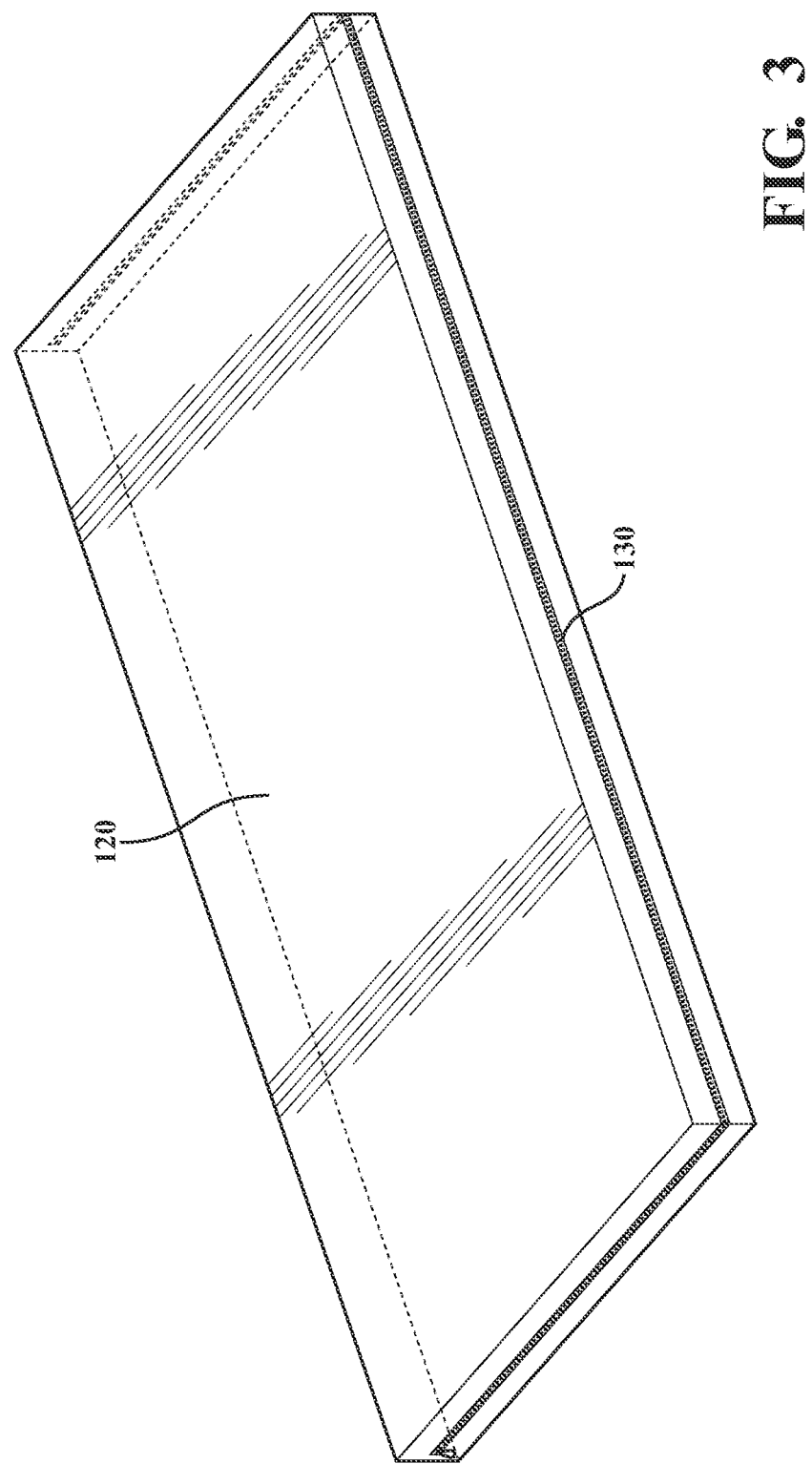
FIG. 3 is a perspective view of the recliner pad according to one disclosed non-limiting embodiment.

The recliner pad assembly 100 also includes an outer cover 120. The outer cover 120 is disposed removably in surrounding relationship around the inner cushion 110. The outer cover 120 may include a zipper 130 (FIG. 3) or other closure to provide for removal of the inner cushion 110. The zipper 130 may extend around the periphery of the outer cover 120.

The outer cover 120 may be manufactured from a dimensionally stable, woven fabric and is dimensioned to closely engage and encapsulate the inner cushion 110. The woven fabric of the outer cover 120 will change shape in response to weight of the user and will permit a corresponding deformation of the inner cushion 110 at those locations where the weight of the user applies direct forces on the recliner pad assembly 10. Additionally, the outer cover 120 will permit some deformation of the lower surface of the inner cushion 110 into gaps, cracks and crevices of the chair 10. However, the outer cover 120 may prevent unimpeded deformation of the inner cushion 110 while still permitting comfort. Furthermore, the outer cover 120 will cause the inner cushion 110 to provide comfort and may be woven from cotton yarns, polyester yarns or a woven blend of cotton and polyester yarns.

The outer cover 120 may also be sized to receive other accessories, such pillows, leg raise pads, absorbent pads, etc.

Figure 4:
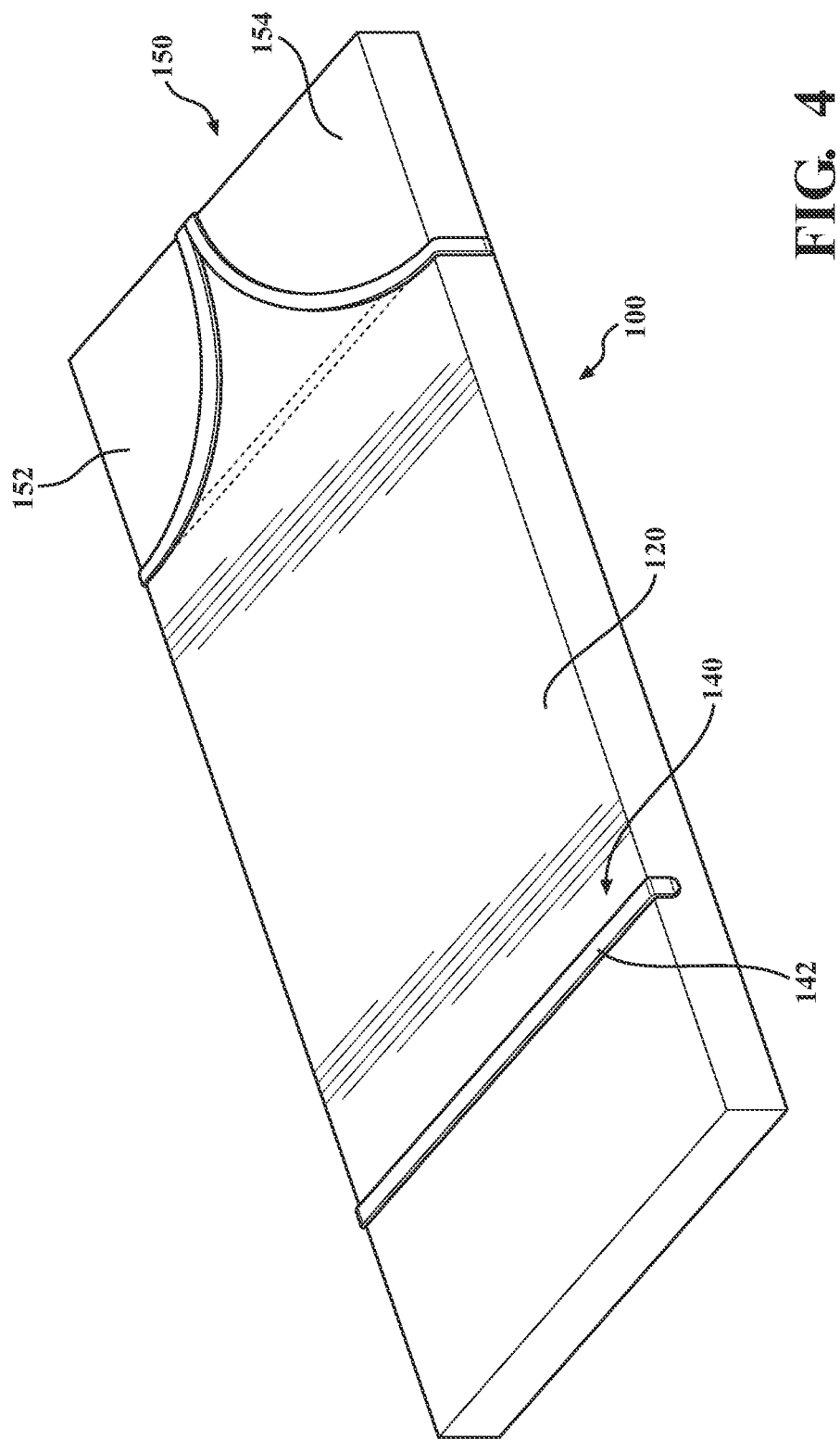
FIG. 4 is a bottom view of the recliner pad according to one disclosed non-limiting embodiment.
Figure 5:
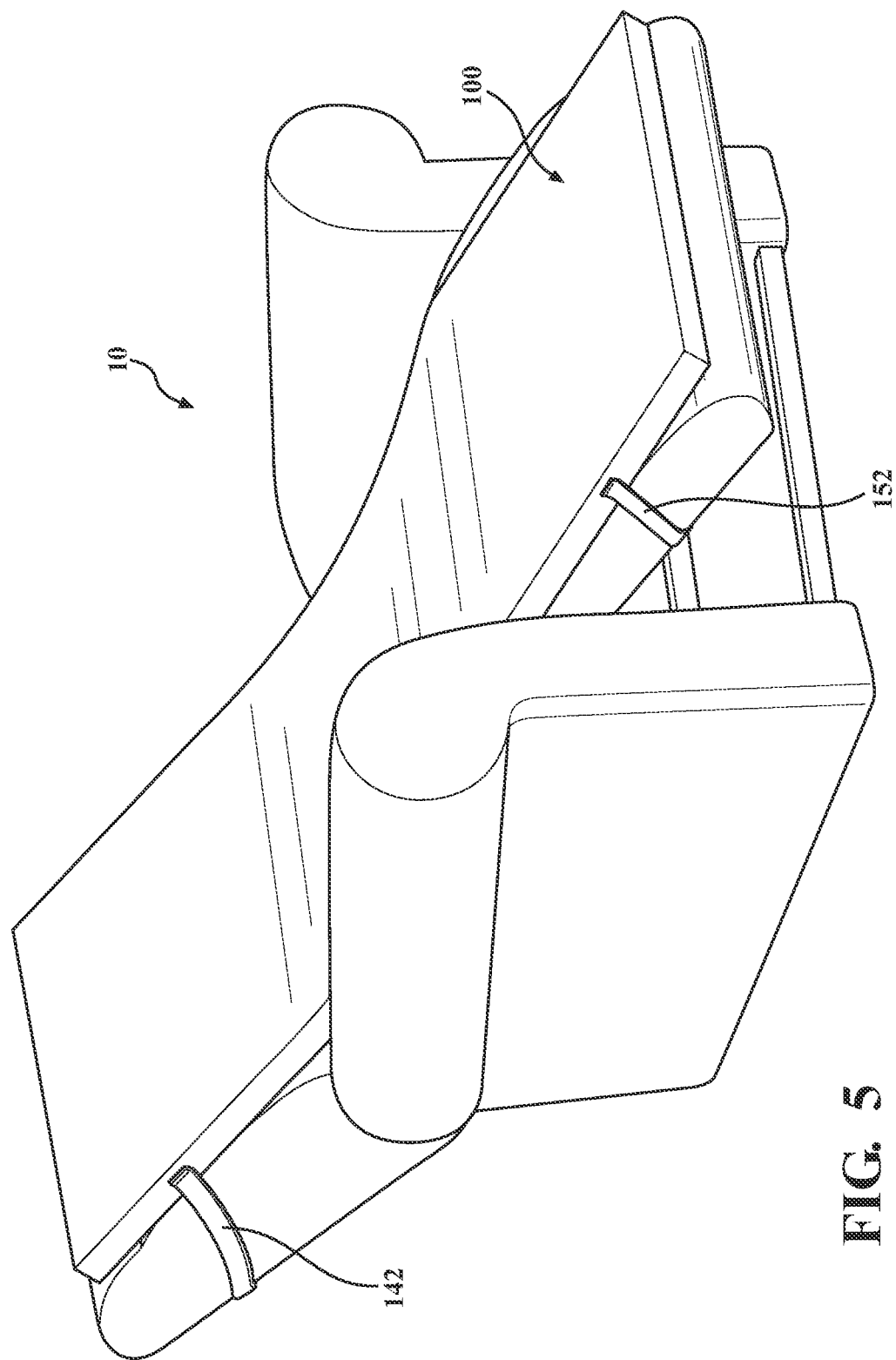
FIG. 5 is a perspective view of a recliner pad assembly that is intended primarily for use on a recliner type chair.

With reference to FIG. 4, the outer cover 120 may also include an upper attachment arrangement 140 and a lower attachment arrangement 150 to facilitate the attachment of the recliner pad assembly 100 to the chair 10. The upper attachment arrangement 140 may include, for example, an upper strap 142 such as an elastic or hook and loop strap that will surround the back support 16. Alternatively, the upper attachment arrangement 140 may include a pocket or other attachment interface. The lower attachment arrangement 150 may include, for example, pockets 152, 154 that engage with the corners of the footrest 20. That is, the pockets 152, 154 may be triangular to slip over the corners of the footrest 20 while the upper strap 142 fits around the back support 16 to facilitate retention of the recliner pad assembly 100 onto the chair 10 (FIG. 5).

Figure 6:
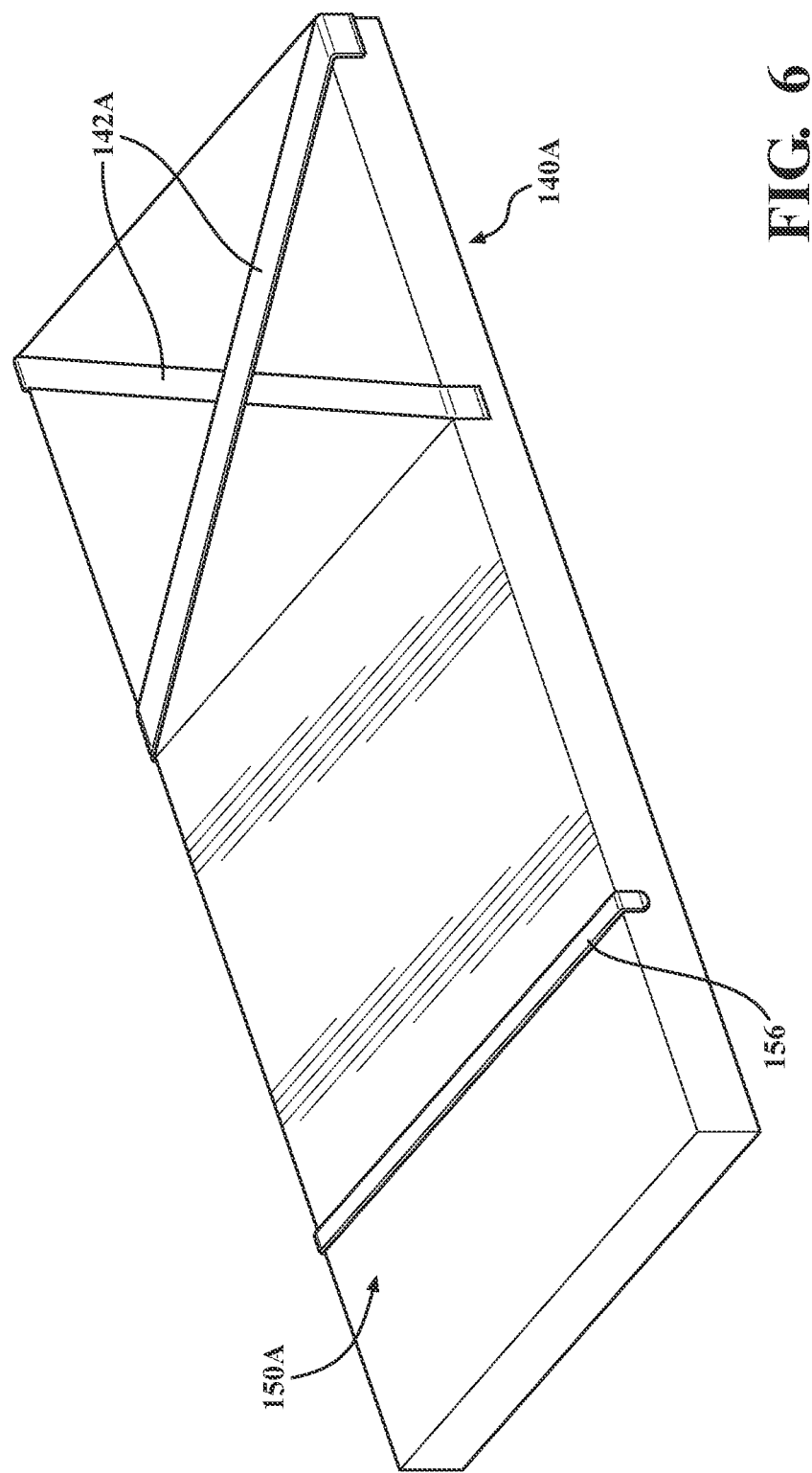
FIG. 6 is a bottom view of the recliner pad according to another disclosed non-limiting embodiment.

With reference to FIG. 6, in another embodiment, the upper attachment arrangement 140A may include upper straps 142A arranged in an "X" pattern and the lower attachment arrangement 150A is a singular strap 156. Various such attachments may be utilized in various combinations.

The recliner pad assembly 100 conforms sufficiently to surface discontinuities in the chair and enables the user to essentially float above the chair without bottoming out and feeling the gaps.

Figure 7:
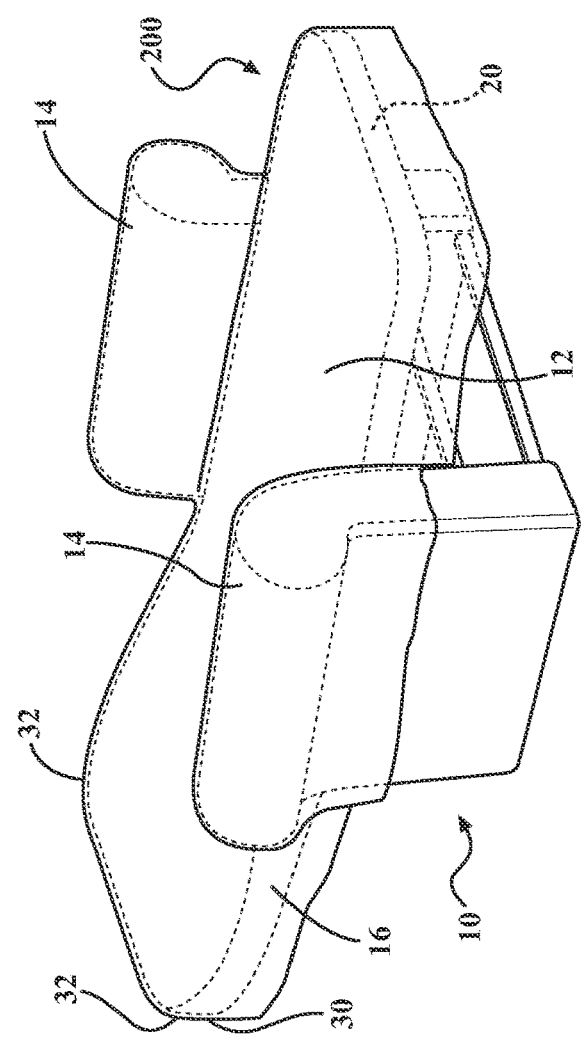
FIG. 7 is a perspective view of a fitted sheet that is intended primarily for use on a recliner type chair according to one disclosed non-limiting embodiment.

With reference to FIG. 7, in another embodiment, a fitted recliner sheet 200 that is intended primarily for use on the recliner type chair 10 is illustrated. The fitted recliner sheet 200 is shaped to closely fit onto the back support 16, the hip/thigh support 12 and the armrests 14 of the recliner type chair 10.

Figure 8:
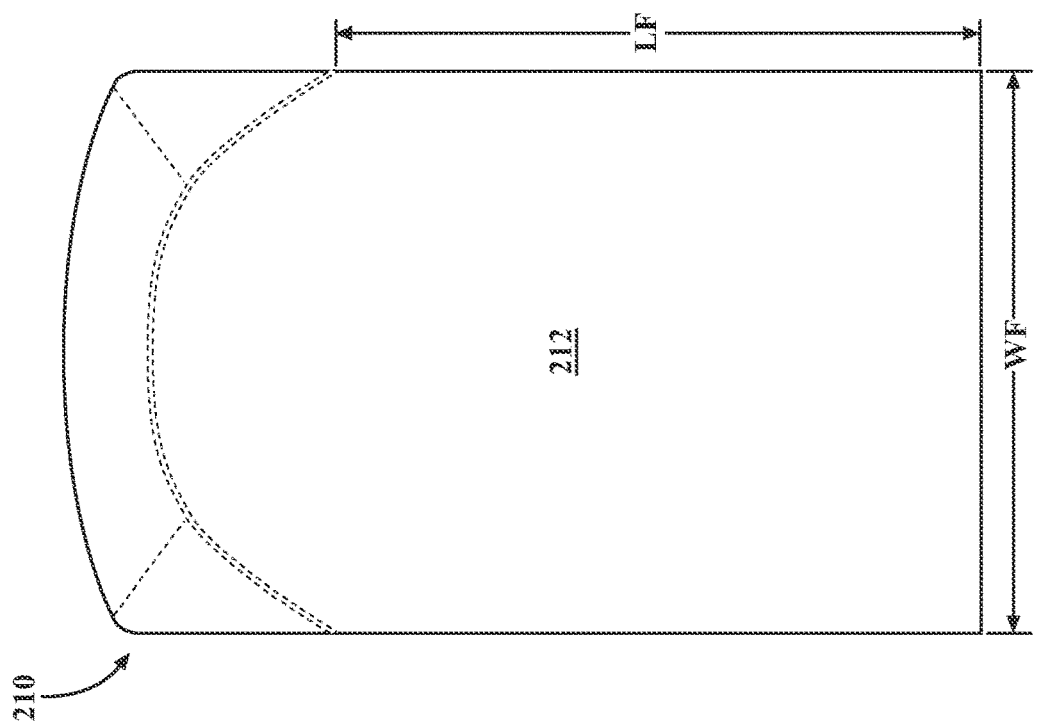
FIG. 8 is a front view of the fitted sheet.
Figure 10:
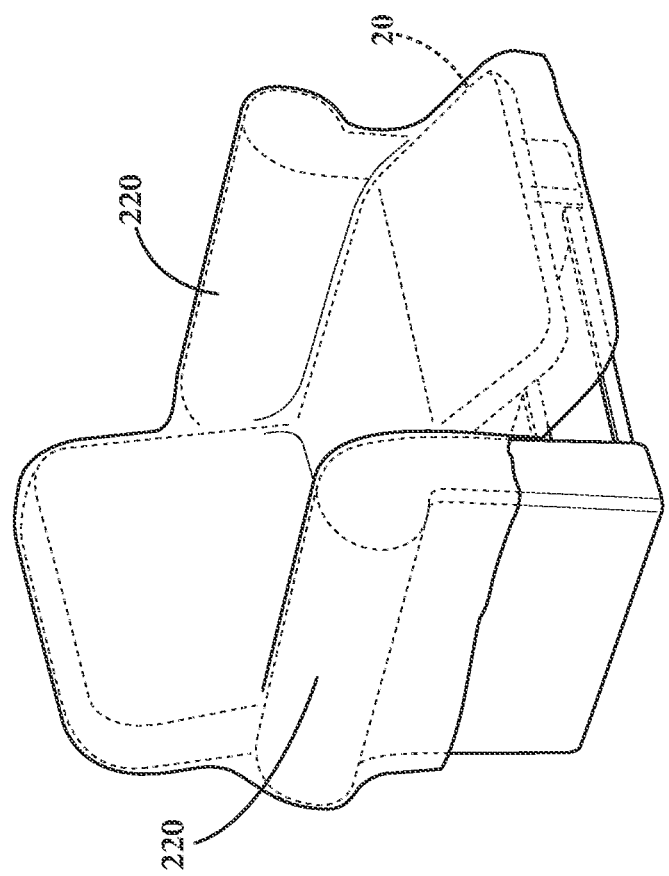
FIG. 10 is a perspective view of a flat sheet that is intended primarily for use on a recliner type chair according to one disclosed non-limiting embodiment.
Figure 9:
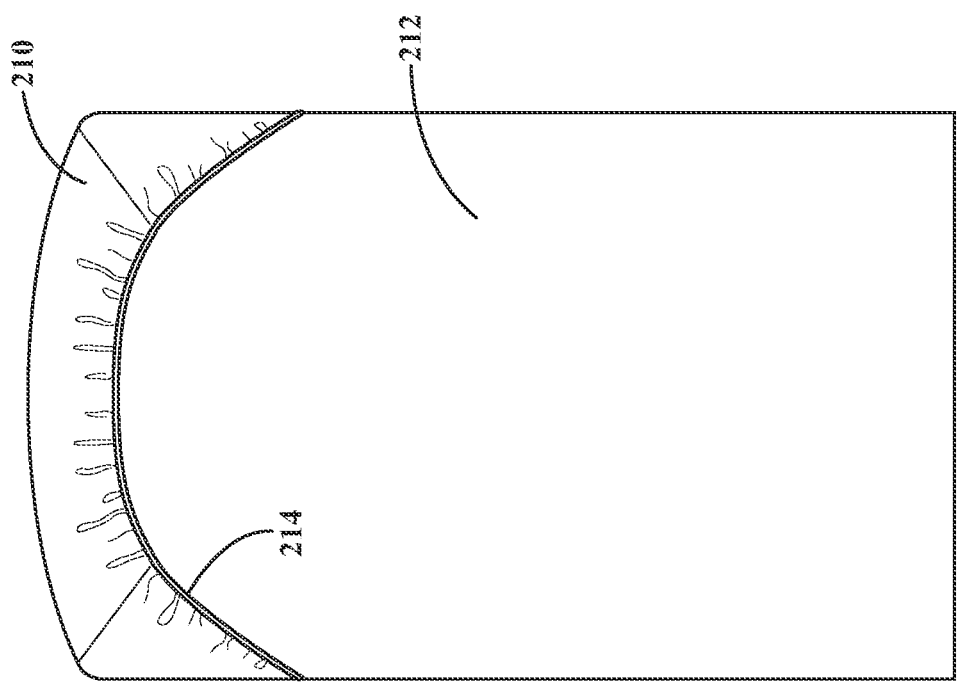
FIG. 9 is a rear view of the fitted sheet.
Figure 12:
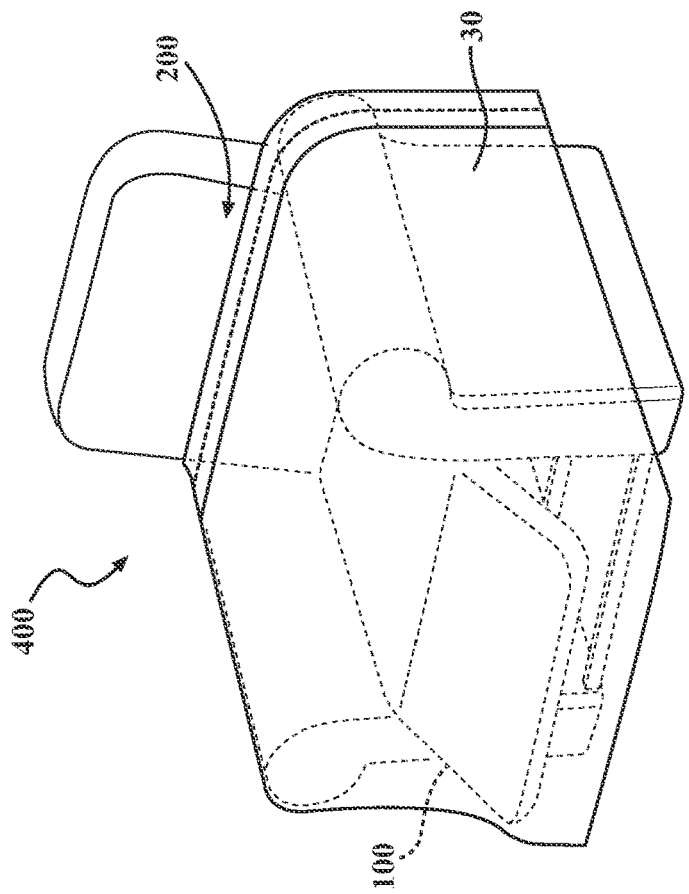
FIG. 12 is a perspective view of a recliner bedding set that is intended primarily for use on a recliner type chair according to one disclosed non-limiting embodiment.

The fitted recliner sheet 200 includes an elastic top edge 210 (FIG. 8) of a rectilinear sheet 212 that slips over the top of the back support 16. The elastic top edge 210 is essentially a pocket with an elastic band 214 (FIG. 9) that is configured to closely fit over a top portion 30 and corners 32 of the back support 16. The fitted recliner sheet 200 may also include arm portions 220 that fit closely over the armrests 14 and then extends to the footrest 20. The arm portions 220 are essentially pockets that fit closely over the armrests 14. The arm portions 220 (FIG. 10) may be separately sewed into the rectilinear sheet 212 to form a three-dimensional sheet configuration that generally matches the shape of the recliner type chair 10. That is, the fitted recliner sheet 200 is not just a planar sheet but has contour defined to follow the recliner type chair 10.

The fitted recliner sheet 200 extends over the footrest 20 but need not be elastically retained thereto to facilitate fitting. The fitted recliner sheet 200, in one example, may be of a length LF which may be approximately 72 inches in length and of a width WF of 54 inches.

Figure 11:
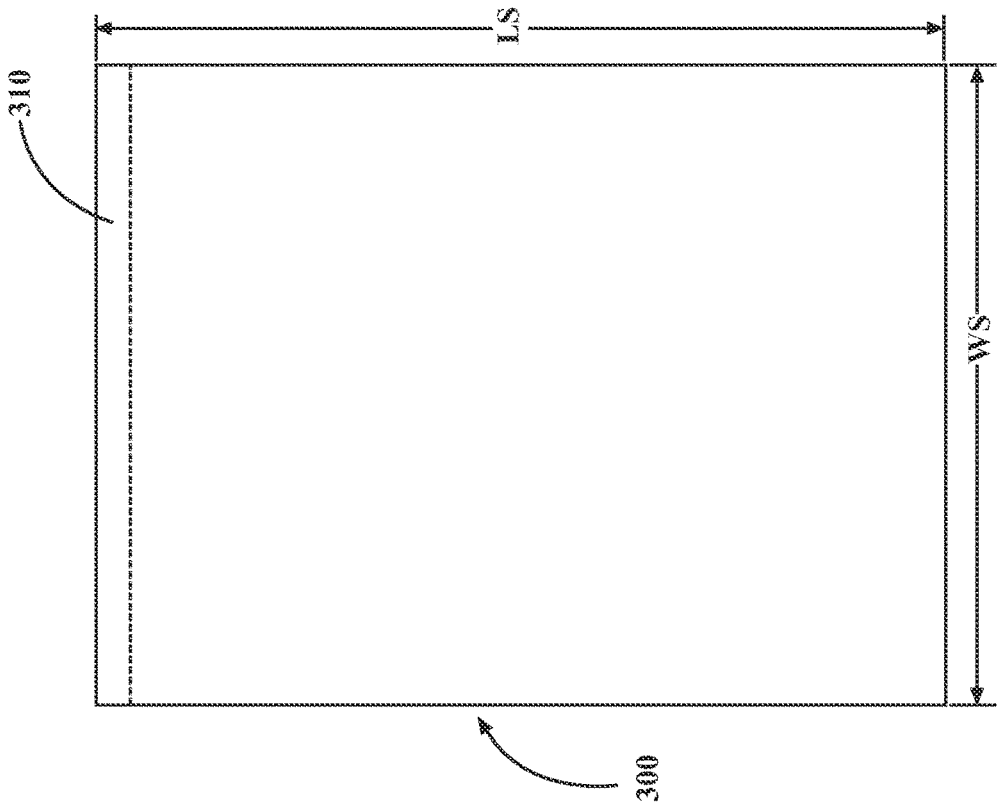
FIG. 11 is a view of the flat sheet for use on a recliner type chair according to one disclosed non-limiting embodiment.

With reference to FIG. 11, in another embodiment, a flat sheet 300 that is intended primarily for use on the recliner type chair 10 is illustrated. The flat sheet 300 in one example, may have a hemmed top edge 310 and be of a length LS which may be approximately 65 inches in length and of a width WS of 60 inches. The flat sheet 300, the fitted recliner sheet 200 and the recliner pad assembly 100 are preferably used together as a recliner bedding set 400 to convert the recliner type chair 10 into a comfortable single bed.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A recliner pad assembly for a recliner type chair, comprising:
    an inner cushion, wherein the inner cushion is substantially rectangular with opposite sides and first and second ends that extend between the sides, the sides spaced apart by a width in a range of 18-33 inches and the first and second ends spaced apart by a length of 65-70 inches, wherein the inner cushion comprises a polyurethane foam that has a density of about 1.8 pounds per inch;
    an outer cover that surrounds the inner cushion, the outer cover manufactured of dimensionally stable, woven fabric that is dimensioned to encapsulate the inner cushion;
    an upper attachment arrangement on the outer cover to engage a back support of the recliners type chair; and
    a lower attachment arrangement on the outer cover, the lower attachment arrangement comprises a first pocket and a second pocket cover to engage with corners of a footrest of the recliner type chair.

2. The recliner pad assembly as recited in claim 1, wherein the inner cushion comprises two or more types of foam.

3. The recliner pad assembly as recited in claim 2, wherein the inner cushion comprises a thickness of 2-3 inches.

4. The recliner pad assembly as recited in claim 3, wherein the inner cushion comprises a viscoelastic foam.

5. The recliner pad assembly as recited in claim 4, further comprising a zipper in the outer cover.

6. The recliner pad assembly as recited in claim 5, wherein the inner cushion is substantially rectangular with opposite sides and first and second ends extending between the sides, the sides spaced apart by a width associated with arms of a recliner and the first and second ends spaced apart by a length to cover a back and a footrest.

7. The recliner pad assembly as recited in claim 6, wherein the upper attachment arrangement comprises a strap.

8. The recliner pad assembly as recited in claim 6, wherein the upper attachment arrangement comprises an "X" arrangement of straps.

9. The recliner pad assembly as recited in claim 6, wherein the lower attachment arrangement comprises a strap.

10. The recliner pad assembly as recited in claim 6, wherein the lower attachment arrangement comprises a first and second triangular pocket.

11. The recliner pad assembly as recited in claim 6, wherein the upper attachment arrangement comprises a strap and the lower attachment arrangement comprises a first and second triangular pocket.

12. The recliner pad assembly as recited in claim 6, wherein the upper attachment arrangement comprises an "X" arrangement of straps and the lower attachment arrangement comprises a strap.

13. A recliner bedding set for a recliner type chair, comprising:
    recliner pad assembly comprising an inner cushion and an outer cover that surrounds the inner cushion, wherein the outer cover manufactured of dimensionally stable, woven fabric that is dimensioned to closely engage and encapsulate that inner cushion, wherein the inner cushion is substantially rectangular with opposite sides and first and second ends extending between the sides, the sides spaced apart by a width associated with arms of a recliner type chair and the first and second ends spaced apart by a length to cover a back support and a footrest of the recliner type chair, wherein the inner cushion comprises a polyurethane foam that has a density of about 1.8 pounds per inch;
    an upper attachment arrangement on the outer cover to attach to the recliner type chair;
    a lower attachment arrangement on the outer cover to attach to the foot rest of the recliner type chair;
    a fitted recliner sheet with an elastic top edge that fits over a top of the back support of the recliner type chair and over the recliner pad assembly and arm portions separately sewed into the rectilinear sheet to form a set of respective pockets configured to match a shape of each armrest of the recliner type chair; and
    a flat sheet that fits at least partially over the fitted recliner sheet.

14. The recliner bedding set as recited in claim 1, wherein the inner cushion is substantially rectangular with opposite sides and first and second ends extending between the sides, the sides spaced apart by a width in a range of 18-33 inches and the first and second ends spaced apart by a length of 65-70 inches, the fitted recliner sheet has a length of 72 inches and a width of 54 inches and the flat sheet has a length of 65 inches and a width of 60 inches.

15. The recliner bedding set as recited in claim 13, wherein the fitted recliner sheet 200 extends over the footrest but is not elastically retained thereto.

16. The recliner bedding set as recited in claim 13, wherein the inner cushion comprises two or more types of foam of a thickness of 2-3 inches.

\* \* \* \* \*